(12) United States Patent
van de Kleut et al.

(10) Patent No.: US 6,843,831 B2
(45) Date of Patent: Jan. 18, 2005

(54) PROCESS FOR THE PURIFICATION OF FLUE GAS

(75) Inventors: Dirk van de Kleut, Hoogland (NL); Robert Jan de Jonge, Bussum (NL)

(73) Assignee: Norit Nederland B.V., Amersfoort (NL)

( * ) Notice: Subject to any disclaimer, the term of this patent is extended or adjusted under 35 U.S.C. 154(b) by 0 days.

(21) Appl. No.: 10/275,675

(22) PCT Filed: May 3, 2001

(86) PCT No.: PCT/NL01/00338

§ 371 (c)(1),
(2), (4) Date: Apr. 11, 2003

(87) PCT Pub. No.: WO01/85307

PCT Pub. Date: Nov. 15, 2001

(65) Prior Publication Data

US 2003/0154858 A1 Aug. 21, 2003

(30) Foreign Application Priority Data

May 8, 2000 (EP) .......................................... 00201649

(51) Int. Cl.$^7$ .............................................. B01D 53/04
(52) U.S. Cl. ............................ 95/134; 95/129; 95/133; 95/135; 95/901
(58) Field of Search ............................... 95/3–137, 901

(56) References Cited

U.S. PATENT DOCUMENTS

| | | | |
|---|---|---|---|
| 4,442,076 A | | 4/1984 | Bonsack |
| 4,708,853 A | * | 11/1987 | Matviya et al. ............. 423/210 |
| 4,889,698 A | * | 12/1989 | Moller et al. ................ 423/210 |
| 5,073,355 A | | 12/1991 | Hartmann |
| 5,254,521 A | * | 10/1993 | Knudson ..................... 502/432 |
| 5,270,279 A | * | 12/1993 | Shiraishi et al. ............. 502/432 |
| 5,403,379 A | | 4/1995 | George |
| 5,700,436 A | * | 12/1997 | Doughty et al. ............. 423/210 |
| 5,733,515 A | * | 3/1998 | Doughty et al. ............. 423/210 |
| 6,027,551 A | * | 2/2000 | Hwang et al. ................ 95/134 |
| 6,521,021 B1 | * | 2/2003 | Pennline et al. .............. 95/134 |
| 6,582,497 B1 | * | 6/2003 | Maes et al. ................... 95/134 |
| 2001/0009125 A1 | * | 7/2001 | Monereau et al. ............ 95/117 |
| 2002/0117094 A1 | * | 8/2002 | Teller et al. ................. 110/345 |
| 2002/0134242 A1 | * | 9/2002 | Yang et al. ................... 95/107 |

FOREIGN PATENT DOCUMENTS

| | | | |
|---|---|---|---|
| EP | 0271618 A1 | * | 6/1988 |
| GB | 725 555 A | | 5/1955 |
| GB | 756 497 A | | 9/1956 |

* cited by examiner

Primary Examiner—Robert H. Spitzer
(74) Attorney, Agent, or Firm—Weingarten, Schurgin, Gagnebin & Lebovici LLP

(57) ABSTRACT

A process for the purification of flue gas, comprising the step of contacting flue gas with a carbonaceous material comprising a solid carbonaceous residue of synthetic rutile production from titaniferous ores.

12 Claims, No Drawings

PROCESS FOR THE PURIFICATION OF FLUE GAS

The invention is directed to a process for the purification of flue gas, wherein flue gas is contacted with a carbonaceous material.

Various industrial processes provide vast amounts of flue gas streams containing environmentally hazardous substances, such as fly ash, acid gases Nox, dioxins, furans, and heavy metal compounds. Examples of such industries are waste incinerators burning various feeds (municipal waste, clinical waste, hazardous waste), the metallurgical industry, the metal recovery industry, power plants, cement plants and the like.

In order to reduce the emission of hazardous substances, many industries are obliged to clean up their flue gases before ventilation in the environment. Depending on the nature of the pollutant, various techniques have been developed to clean up the flue gas. For example, fly ash can be removed with electrostatic precipitators (ESP), fabric filters (FF) or wet scrubbers. Acid gases are mostly bound to alkaline compounds, either in a (semi-) dry system with spray dryer adsorbers (SDA), or in wet systems using scrubbers. Many flue gas cleaning installations have been built containing these basic components.

For the removal of dioxins, furans and mercury compounds from flue gas often additional measures have to be taken in order to comply with the current emission limits. Mostly, the flue gases are brought into contact with an adsorbent to bind these compounds.

A well-known method to remove dioxins, furans and mercury compounds is to inject a powdered adsorbent in the ducts of a flue gas cleaning system, after which hazardous compounds adsorb onto the adsorbent. In subsequent parts of the installation the spent adsorbent is removed from the flue gas in a particle collection system. The collection of the adsorbent is often performed in existing ESP, FF or wet scrubbers, which makes this technology especially suited for existing flue gas cleaning installations. A vast amount of patents have been granted describing various flue gas cleaning installation modifications applying powdered adsorbents for flue gas cleaning.

The conditions under which adsorbents are applied depend to a large extent on the nature of the industrial process generating the flue gases and on the modification of the flue gas cleaning installation.

In general, flue gas consists of fly ash and various gases and volatile compounds, such as nitrogen, oxygen, carbon dioxide, nitrogen oxides, water, carbon monoxide, sulphur dioxide, and various acid gases. The precise composition of the flue gas is determined by the nature of the process generating the flue gas and can vary significantly in time. A suitable adsorbent must be able to withstand these variations of the flue gas composition.

The maximum temperature at which powdered adsorbents can be used is partly determined by the maximum operating temperature of the particle collection system. For ESP and FF the maximum operating temperatures are typically 450° C., respectively 300° C. In wet scrubbers the maximum operating temperature is always below 100° C. The maximum application temperature is preferably kept below 250° C. to prevent the formation of additional dioxins due to the so-called de novo synthesis route.

Various adsorbents are used for the cleanup of flue gas. Commonly reported adsorbents for this application are activated carbon and activated lignite cokes.

The adsorption capacities of activated carbon and activated lignite cokes for dioxins and furans can be extremely diverse, depending amongst others on the nature of the raw material and on the method of production. Usually, the carbon types used in flue gas cleaning are produced from raw materials like peat, coal, or lignite, produced by stream activation processes. Alternatively, carbon or activated carbon waste. The PAC types based on reactivated carbon or on activated carbon waste generally have a varying quality die to the varying quality of the raw material.

The main properties determining the quality of activated carbon for flue gas cleaning are the adsorption properties and the ignition properties.

The adsorption properties are mainly determined by the pore structure and by the particle size distribution of the powdered activated carbon. The pore structure of the carbon is defined by the nature of the raw material and by the process conditions during activation. A suitable activated carbon preferably contains a high micropore volume for a high adsorption capacity, next to a high mesopore volume for a rapid transport of the adsorbates to the adsorbing pores. The particle size distribution is primarily determined by the quality of the milling equipment.

When applying powdered carbon under oxidising conditions at elevated temperatures as in flue gas, the possibility of ignition of the carbon has to be taken into account. Typically, the temperature in the ESP or FF of the flue gas cleaning system ranges from 100 to 200° C. In some cases the temperatures are even higher.

Ignition of carbon adsorbents is usually first observed in the dust collection sections of an ESP or a FF, since on these spots warmed up carbon can accumulate. Under sufficiently severe conditions in principle all carbon adsorbents can eventually ignite, resulting in undesired excessive temperature increases. Changes in the design of the installation can reduce the ignition hazard. Choosing the proper carbon adsorbent can reduce the ignition hazard as well.

In general the ignition properties of an activated carbon or other material used in flue gas cleaning systems are determined using a standard ignition test. Such tests are defined in the Recommendations for the transport of dangerous goods, 9th revised edition, United Nations, 1995, parts 14.5.5 and 33.3.1.3.3.

Next to the adsorption and ignition properties, secondary properties such as material availability and production costs also determine the suitability of an adsorbent for flue gas cleaning.

It is an object of the present invention to provide an alternative to the presently used powdered activated carbon, whereby the ignition characteristics of the material are improved.

It is also an object of the present invention to provide a carbonaceous material suitable for flue gas purification, wherein the material has an improved balance of properties in relation to adsorption characteristics and ignition behaviour.

The present invention is based on the surprising discovery of a material that meets these objects, when applied in flue gas purification. Surprisingly, a new carbonaceous adsorbent material was found having a pore structure that is likely superior to that of activated carbons commonly used for flue gas cleaning. The new material is produced as a by-product in the synthetic rutile production industry and has excellent ignition properties. These combined properties make this new adsorbent especially suitable for flue gas cleaning.

The solid carbonaceous material is produced as waste product during the production of synthetic rutile from titaniferous ores (ilmenite, leucoxene, or slag). During the production of synthetic rutile, carbon is used for the chemical reduction of iron within the titaniferous minerals, possibly in combination with chlorine. The reduced iron is subsequently removed from the minerals to obtain synthetic rutile. (See Ullmann's Encyclopedia of Industrial Chemistry, Sixth Ed., 199 Electronic Release, Wiley-VHC, Weinheim (DE) on Titanium Dioxide, § 2.1.2.2 Synthetic Raw Materials).

After recovery of the synthetic rutile from the solid material a carbonaceous waste product remains, which has been found to have a pore structure corresponding to the pore structure of activated carbons that are suitable for adsorption of contaminants such as dioxins, furans and mercury compounds from flue gas. If necessary the material can be purified, sieved and/or ground to obtain the optimal properties. More in particular, the particle size may need to be regulated, depending on the type of system used. Generally the material is modified to have a particle size between 1 and 100 μm.

The carbonaceous material can be used in the same manner as the presently used powdered carbons, by injecting them at a suitable location in the flue gas. This can be done in the dry form, as wetted material and/or in combination with alkaline materials, such as lime to remove acidic substances from the flue gas. After the material has adsorbed the contaminants, it is again removed from the gas, for example by ESP or FF.

The flue gas has generally been subjected to some treatment prior to the introduction of the carbonaceous material, such as cooling to recover some heat from it, removal of fly ash, and the like. More in particular, the flue gas may be cooled to a temperature between 0 and 500° C., before contacting it with the solid carbonaceuos material.

The invention is now elucidated on the basis of the following examples, which are not intended to limit the scope of the invention.

EXAMPLE 1

The pore structure of activated carbons is generally divided into three major size ranges: micropores (pore radius<1 nm), mesopores (1 nm<pore radius<25 nm), and macropores (pore radius>25 nm). The respective pore volumes are generally derived from adsorption experiments with standard adsorbates (micropores and mesopores), or from mercury porosimetry (macropores and larger mesopores). With activated carbons used for the purification of gases, the micropores and the mesopores (adsorbing pores) are generally used for adsorption of adsorbates, whereas the macropores and larger mesopores (transporting pores) are used for transport of adsorbates from the surroundings to the adsorbing pores. A suitable activated carbon for flue gas cleaning contains both adsorbing pores and transporting pores in sufficient amounts, to provide optimum adsorption capacity and fast adsorption kinetics. For powdered activated carbon types the macropores have largely disappeared due to the milling process.

A commonly accepted analytical parameter for activated carbon is the so-called iodine number. The iodine number is the amount of iodine adsorbed onto activated carbon (in mg iodine/g carbon) in equilibrium with a 0.02 N iodine solution The test method has been described extensively in ASTM D 4607-86. The iodine number of activated carbon is related to its micropore volume. An alternative parameter indicating the micropore volume of activated carbon is the equilibrium butane adsorption capacity when the carbon is brought into contact with dry air containing 0.24 vol % butane. The iodine number is thus related to the volume of the adsorbing pores.

A parameter indicating the combined pore volume of larger mesopores and small macropores is the molasses number. The molasses number is defined as the number of milligrams activated carbon required to achieve the same decolorizing effect as 350 mg of a standard carbon, determined using a standard molasses solution by a standard procedure. Due to the large size of the molasses molecules only large pores can be entered, therefore, the molasses number is an indication for the volume of the transporting pores. In this case, the molasses number decreases as the transporting pore volume increases.

Table 1 contains typical iodine numbers and the molasses numbers of several activated carbon types that are commonly used for flue gas cleaning, as well as those of the carbonaceous residue produced in the synthetic rutile production process. Based on these values, the adsorption properties and adsorption kinetics of the carbonaceous residue are more favorable for flue gas cleaning compared to the currently applied carbon types, because both adsorption and transport pore volumes are higher.

TABLE 1

Typical Iodine numbers and Molasses numbers of various activated carbons used for flue gas cleaning, and of the carbonaceous residue material.

| Carbon type | Iodine number [mg/g] | Molasses number [a.u.] |
|---|---|---|
| Darco FGD | 550 | 400 |
| NORIT GL 50 | 700 | 475 |
| NORIT SA Super | 1050 | 200 |
| Carbonaceous residue | 1200 | 150 |

EXAMPLE 2

The auto-ignition hazard of stationary activated carbon layers can be assessed by determining the so-called critical ignition temperature (CIT). The test method for determining the CIT of powdered activated carbon is similar to a test mentioned in the "Recommendations on the transport of dangerous goods, issued by the United Nations", section 14.5.5 (ST/SG/AC.10/1/Rev.9). This test is designed to establish whether or not self-heating substances can be transported in bulk. In the UN-test it is determined if a carbon sample in a 1 liter cube (10×10×10 cm) auto-ignites at a fixed temperature of 140±2° C. An elaborate description of this test can be found in the above-mentioned manual.

The CIT test method is in principal identical to the UN test method, only the temperature at which the sample is tested is made variable. Depending on the outcome of the first test at a pre-selected temperature, a new test temperature is chosen and a fresh carbon sample is tested. This is repeated until the highest temperature at which no ignition took place and the lowest temperature at which ignition did take place are about 10° C. apart. The CIT is defined as the average of these temperatures.

Table 2 contains the CIT values of several activated carbon types that are commonly used for flue gas cleaning, as well as that of the carbonaceous residue produced in the synthetic rutile production process. The data in Table 2 clearly indicate that the CIT of the carbonaceous residue is significantly higher than that of the regular flue gas cleaning carbon types.

TABLE 2

Typical critical ignition temperatures (CIT) and average particle size of various activated carbons used for flue gas cleaning, and of the carbonaceous residue material.

| Carbon type | Particle size ($d_{50}$) [μm] | CIT [° C.] |
|---|---|---|
| Darco FGD | 14 | 240 |
| NORIT GL 50 | 17 | 250 |
| NORIT SA Super | 7 | 270 |
| Carbonaceous residue | 33 | 330 |

What is claimed is:

1. Process for the purification of flue gas, comprising the step of contacting flue gas with a carbonaceous material, comprising a solid carbonaceous residue of synthetic rutile production from production from titaniferous ores.

2. Process according to claim 1, further comprising injecting said carbonaceous material into the flue gas to be purified.

3. Process according to claim 2, further comprising removing said carbonaceous from the flue gas after sufficient contact time for adsorbing contaminants from the flue gas.

4. Process according to claim 3, further comprising:
cooling flue gas to a temperature between 0 and 500° C., before contacting it with said solid carbonaceous material;
removing dioxins, furans and mercury compounds from the flue gas;
contacting said solid carbonaceous material with the flue gas in a dry state, wet state and/or in combination with lime; and
sieving, purifying, and/or grinding said carbonaceous material prior to use.

5. The process of claim 4, wherein said flue gas originates from waste incinerators, metallurgical facilities, metal recovery facilities, power plants or cement plants.

6. Process according to claim 2, further comprising:
cooling the flue gas to a temperature between 0 and 500° C., before contacting it with said solid carbonaceous material;
removing dioxins, furans and mercury compounds from the flue gas;
contacting said solid carbonaceous material with the flue gas in a dry state, wet state and/or in combination with lime; and
sieving, purifying, and/or grinding said carbonaceous material prior to use.

7. The process of claim 6, wherein said flue gas originates from waste incinerators, metallurgical facilities, metal recovery facilities, power plants or cement plants.

8. Process according to claim 1, further comprising cooling the flue to a temperature between 0 and 500° C., before contacting it with the said solid carbonaceous material.

9. Process according to claim 1, wherein said flue gas originates from waste incinerators, the metallurgical facilities, metal recovery facilities, power plants or cement plants.

10. Process according to claim 1, further comprising removing dioxins, furans and mercury compounds from the flue gas.

11. Process according to claim 1, further comprising contacting said solid carbonaceous material with the flue gas in dry state, wet state and/or in combination with lime.

12. Process according to claim 1, further comprising sieving, purifying, and/or grinding said carbonaceous material prior to use.

* * * * *

UNITED STATES PATENT AND TRADEMARK OFFICE
CERTIFICATE OF CORRECTION

PATENT NO.         : 6,843,831 B2                                     Page 1 of 1
APPLICATION NO. : 10/275675
DATED              : January 18, 2005
INVENTOR(S)       : Dirk van de Kleut et al.

It is certified that error appears in the above-identified patent and that said Letters Patent is hereby corrected as shown below:

Column 2, lines 5-6, "Alternatively, carbon or activated carbon waste." should read --Alternatively, carbon adsorbents are produced by milling reactivated granular carbon or activated carbon waste.--;

Column 2, line 7, "die" should read --due--;

Column 3, after line 18, insert --It is possible to combine the carbonaceous material also with other solid materials, such as activated carbon and the like. However, it is preferred that the amount of material added is subordinate in amount to the solid carbonaceous material.--;

Column 5, line 16, delete ",";

Column 5, line 18, delete "from production"; and

Column 5, line 23, "carbonaceous from" should read --carbonaceous material from--.

Signed and Sealed this

Third Day of October, 2006

JON W. DUDAS
*Director of the United States Patent and Trademark Office*